United States Patent
Suzuki et al.

(10) Patent No.: US 7,527,333 B2
(45) Date of Patent: May 5, 2009

(54) OCCUPANT PROTECTING APPARATUS (75) Inventors: Shigeyuki Suzuki, Aichi-ken (JP); Kenji Fujimura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/606,372

(22) Filed: Nov. 30, 2006

(65) Prior Publication Data

US 2007/0132213 A1    Jun. 14, 2007

(30) Foreign Application Priority Data

Dec. 1, 2005  (JP) .............................. 2005-348327
Aug. 30, 2006 (JP) .............................. 2006-234309

(51) Int. Cl.
*B60N 2/42* (2006.01)
*B60R 21/16* (2006.01)

(52) U.S. Cl. ............... 297/216.1; 280/728.2; 280/730.1

(58) Field of Classification Search ............ 297/216.1, 297/284.11, DIG. 3, 464, 468; 280/728.2, 280/730.1, 753, 801.1; 296/68.1

See application file for complete search history.

(56) References Cited

U.S. PATENT DOCUMENTS

| | | | | |
|---|---|---|---|---|
| 6,752,454 B2 * | 6/2004 | Ruel et al. | ............... | 297/216.1 |
| 6,935,684 B2 * | 8/2005 | Sakai | ..................... | 297/216.1 |
| 7,306,257 B2 * | 12/2007 | Yoshikawa et al. | ....... | 280/728.2 |

FOREIGN PATENT DOCUMENTS

| | | |
|---|---|---|
| JP | A-2001-239872 | 9/2001 |
| JP | A-2002-79861 | 3/2002 |
| JP | A-2004-168227 | 6/2004 |
| JP | A-2005-112000 | 4/2005 |
| JP | A-2005-193844 | 7/2005 |

\* cited by examiner

*Primary Examiner*—Milton Nelson, Jr.
(74) *Attorney, Agent, or Firm*—Posz Law Group, PLC (57) ABSTRACT

There is provided an occupant protecting apparatus which reduces a load applied to an occupant caused by inflating an airbag in a seat portion. The occupant protecting apparatus is provided in a seat portion. The occupant protecting apparatus is constituted by an inflator serving as a gas generation source, and an airbag. In a state in which a gas is not supplied from the inflator, that is, in a state in which the airbag is extended to a rear side from a front side of the seat portion under a non-inflated state, a ratio between a distance from a center position of the inflator to a rear end of a support wall of a second bottom frame, and a distance from a distal end of the airbag to the rear end of the support wall of the second bottom frame is set to be equal to or less than 0.77.

4 Claims, 7 Drawing Sheets

OCCUPANT PROTECTING APPARATUS

CROSS REFERENCE TO RELATED APPLICATIONS

This application is based on and claims priority from Japanese Patent Application No. 2005-348327, filed on Dec. 1, 2005 and Japanese Patent Application No. 2006-234309, filed on Aug. 30, 2006, the contents of which are incorporated herein by reference. This application is also related to U.S. patent application Ser. No. 11/606,373, filed simultaneously on Nov. 30, 2006 with the present application and entitled "Passenger Protection Device."

BACKGROUND OF THE INVENTION

The present invention relates to an occupant protecting apparatus provided with an airbag inflated and deployed in a seat portion of a seat of a vehicle by a gas generated from a gas generation source.

There is a seat belt apparatus having a shoulder belt portion bridged over a side portion of a lumbar portion via a front side of a chest portion obliquely from a shoulder portion, and a lap belt portion bridged over a left side portion via a front side of the lumbar portion in a horizontal direction from the lumbar portion, for example, a right side portion thereof. The seat belt apparatus mentioned above is used in such a manner that the lap belt portion is arranged at a proper position of the lumbar portion, that is, a front side of a pelvis.

In the case that a vehicle comes into collision with a front surface, an occupant who is going to move forward due to inertia is withheld on the seat on the basis of a retaining operation of the seat belt apparatus. However, in the case that the occupant takes a comfort posture, there is a case that a phenomenon that the lumbar portion of the occupant comes off the lap belt portion so as to move forward, that is, a submarine phenomenon is generated. An occupant protecting apparatus for preventing the submarine phenomenon is disclosed in Japanese Laid-Open Patent Publication Nos. 2001-239872, 2002-79861, 2004-168227, 2005-112000, and 2005-193844.

In Japanese Laid-Open Patent Publication No. 2001-239872, there is disclosed an occupant protecting apparatus which inflates an airbag provided in a seat portion, thereby pushing up a cushion in the seat portion so as to prevent the submarine phenomenon. The airbag is inflated and deployed on a base plate extending approximately over the entire length of the seat portion in a longitudinal direction.

In Japanese Laid-Open Patent Publication No. 2002-79861, there is disclosed an occupant protecting apparatus which inflates and deploys an airbag provided in a seat portion, thereby pushing a hip portion of an occupant so as to prevent the submarine phenomenon. The airbag is inflated and deployed on a support plate extending approximately over the entire length of the seat portion in a longitudinal direction.

In Japanese Laid-Open Patent Publication No. 2004-168227, there is disclosed an occupant protecting apparatus which inflates an airbag provided on a seat pan constituting a seat portion, thereby pushing up a cushion of the seat portion so as to prevent the submarine phenomenon. A wire spring for cushioning is tensioned between the seat pan and a support shaft. The installation of the wire spring for cushioning contributes to an improvement of a comfortable seating performance.

In Japanese Laid-Open Patent Publication No. 2005-112000, there is disclosed an occupant protecting apparatus which inflates an airbag provided on a support panel constituting a seat portion, thereby pushing up a cushion in a seat portion so as to prevent the submarine phenomenon. A wire spring for cushioning is arranged in a rear side of the support panel.

In Japanese Laid-Open Patent Publication No. 2005-193844, there is disclosed an occupant protecting apparatus which inflates an airbag provided in a seat portion, thereby pushing up a cushion in a seat portion so as to prevent the submarine phenomenon. The airbag is inflated exclusively upward on a front panel corresponding to a part of a frame body. The wire spring for cushioning is tensioned between a rear frame corresponding to a part of the frame body and a front panel.

In the seat disclosed in Japanese Laid-Open Patent Publication Nos. 2001-239872 and 2002-79861, there is no wire spring for cushioning that contributes to an improvement of the comfortable seating performance. In the seat disclosed in Japanese Laid-Open Patent Publication Nos. 2004-168227, 2005-112000, and 2005-193844, the wire spring for cushioning that contributes to an improvement of the comfortable seating performance is provided. In the sight of the comfortable seating performance, it is desirable to provide a wire spring for cushioning.

A case will be considered in which the airbag inflated and deployed toward a rear side disclosed in Japanese Laid-Open Patent Publication No. 2002-79861 is applied to the seat disclosed in Japanese Laid-Open Patent Publication Nos. 2004-168227, 2005-112000 and 2005-193844. In other words, in the case that the airbag after inflated and deployed is structured such as to protrude to a rear side from the frame (the seat pan, the support panel or the front panel) supporting the cushion of the seat portion, a push-up force generated by the protruding portion is lowered by a downward decline of the protruding portion. It is possible to increase the push-up force generated by the protruding portion by enlarging a protruding amount of the protruding portion. However, it is expected that a load applied to a femoral portion and the hip portion of the occupant at a time when the airbag is inflated and deployed becomes larger in accordance with an increase of the protruding amount. Accordingly, it is desirable to reduce the load mentioned above, however, none of the publications refers to the load mentioned above.

SUMMARY OF THE INVENTION

An object of the present invention is to provide an occupant protecting apparatus which reduces a load applied to an occupant by due to inflation of an airbag in a seat portion.

The present invention relates to an occupant protecting apparatus provided with an airbag which is inflated and deployed in a seat portion of a seat of a vehicle by a gas generated from a gas generation source. In accordance with an aspect of the present invention, the seat portion is provided with a bottom frame, the airbag is inflated and deployed on the bottom frame, the bottom frame has a support wall supporting the airbag after being inflated and deployed from a lower side, and a ratio L2/L1 is equal to or less than 0.77, in which L1 is a distance from a center position of the gas generation source in a longitudinal direction of the seat portion to a rear end of the support wall, and L2 is a distance from a distal end of the airbag extended to a rear side from a front side of the seat portion in a non-inflated state to the rear end of the support wall.

The structure in which the ratio L2/L1 is set to be equal to or less than 0.77 is preferable for reducing the load applied to the occupant caused by inflating the airbag while preventing the submarine phenomenon.

In accordance with a second aspect of the present invention, the occupant protecting apparatus is further provided with a seat belt apparatus constraining the occupant to the seat, the airbag is arranged between a seat cushion in the seat portion and a support plate supporting an approximately entirety of the seat cushion from a lower side, and a ratio D1/D2 becomes equal to or more than 0.98 and equal to or less than 1.40 at a time when the airbag is in a non-inflated state, in which D1 is a horizontal distance from a front end of the airbag to a rear end, and D2 is a horizontal distance from the front end to a distal end of a buckle in the seat belt apparatus.

It is assumed that the airbag mentioned above is not arranged between the seat cushion and the support plate. If an impact is applied to the vehicle in which the occupant is constrained to the seat by the seat belt apparatus from a front side, the entire body of the occupant is going to move forward on the basis of inertia. There is a risk that there is generated a submarine phenomenon that the lumbar portion comes off the lap belt portion of the webbing of the seat belt apparatus so as to move forward depending on the seating posture of the occupant.

On the contrary, in the case that the airbag is arranged between the seat cushion and the support plate, such as in the second aspect, the gas is generated from the gas generation source in response to the impact of the front side, and the airbag is inflated. The seat cushion is lifted up on the basis of the inflation, and a rear side portion of a knee back in a lower body of the occupant is pressed upward. On the basis of the pressing, a forward motion of the lumbar portion mentioned above is limited and the submarine phenomenon mentioned above is suppressed.

The length of the airbag has a proper range. In the case that the airbag is excessively long to a rear side, the entirety of the lower body of the occupant is lifted up on the basis of the inflation of the airbag in response to the impact from the front side, limiting the forward motion of the lumbar portion so as to reduce the effect of suppressing the submarine phenomenon. Accordingly, the load applied to the lumbar portion of the occupant becomes enlarged on the basis of the inflation of the airbag.

In this case, when the airbag is under the non-inflated state, the ratio between the horizontal distance D1 from the front end of the airbag to the rear end and the horizontal distance D2 from the front end to the distal end of the buckle of the seat belt apparatus is set to D1/D2. The horizontal distance D1 approximately corresponds to the length of the airbag. Deciding the position of the front end of the airbag and variously changing the longitudinal position of the rear end, the length of the airbag is changed in correspondence thereto. On the other hand, the position of the distal end of the buckle is defined in the occupant protecting apparatus. Accordingly, when the position of the rear end of the airbag is set to the rear side and the airbag is elongated rearward, the ratio D1/D2 becomes larger. Further, the load applied to the lumbar portion and an acceleration generated in the lumbar portion have a corresponding relationship. Accordingly, various values were set as the ratio D1/D2 mentioned above, and the acceleration generated in the lumbar portion of the occupant was measured. The results showed that, in the sight of reducing the load mentioned above, it is necessary that the ratio D1/D2 is equal to or less than 1.40. If the airbag is longer to the rear side, and the ratio D1/D2 is larger than 1.40, the load applied to the occupant gets over an allowable range.

In this regard, in accordance with the second aspect, the ratio D1/D2 is set to be equal to or less than 1.40. Accordingly, it is possible to reduce the load applied to the occupant by inflating the airbag so as to set the load within the allowable range.

In this case, it is necessary that the ratio D1/D2 is equal to or more than 0.98 in addition to being equal to or less than 1.40. If the ratio D1/D2 is made smaller than 0.98, it is impossible to sufficiently obtain a lift-up amount of the seat cushion on the basis of the inflation of the airbag, and an upward pressing force applied to the portion rearward of the knee back in the lower body of the occupant by extension, whereby it is hard to limit the forward motion of the lumbar portion.

In this regard, in accordance with the second aspect, the ratio D1/D2 is set to be equal to or more than 0.98. Accordingly, it is possible to limit the forward motion of the lumbar portion on the basis of the inflation of the airbag, and it is possible to securely suppress the submarine phenomenon mentioned above.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A description will be given of a first embodiment of the present invention with reference to FIGS. 1 to 4.

Figure 1A:
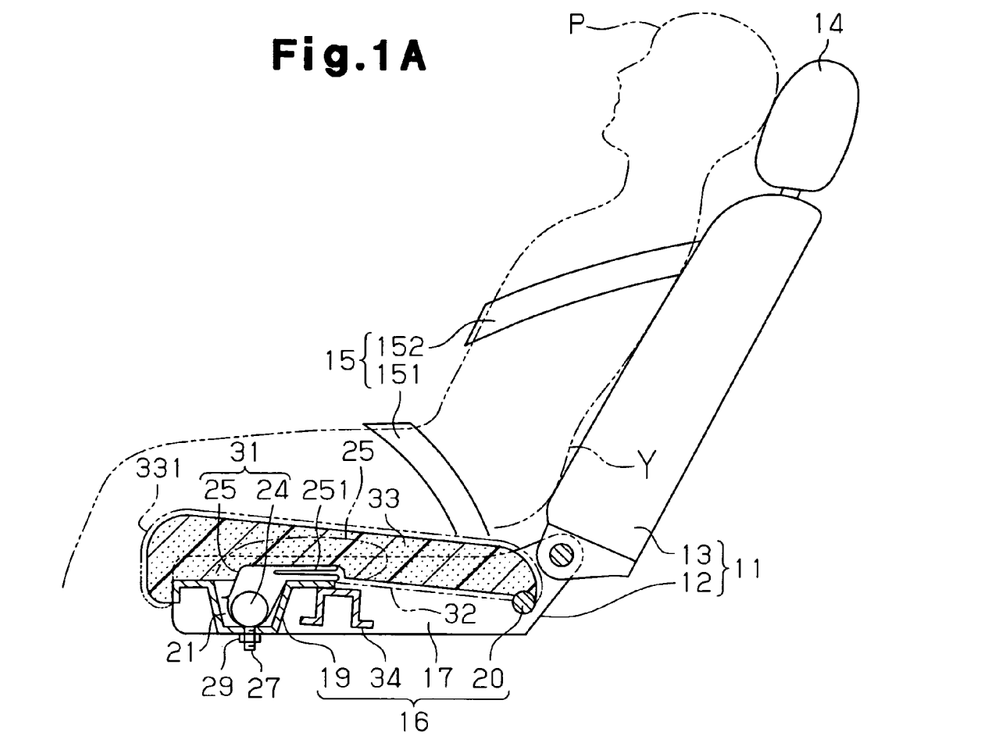
FIG. 1A is a side cross-sectional view showing an occupant protecting apparatus according to a first embodiment.

As shown in FIG. 1A, a seat 11 arranged within a compartment of a vehicle (not shown) is provided with a seat portion 12, a backrest portion 13 arranged rearward of the seat portion 12 in such a manner that an inclination is adjustable, and a headrest 14 provided in an upper end of the backrest portion 13.

Figure 2:
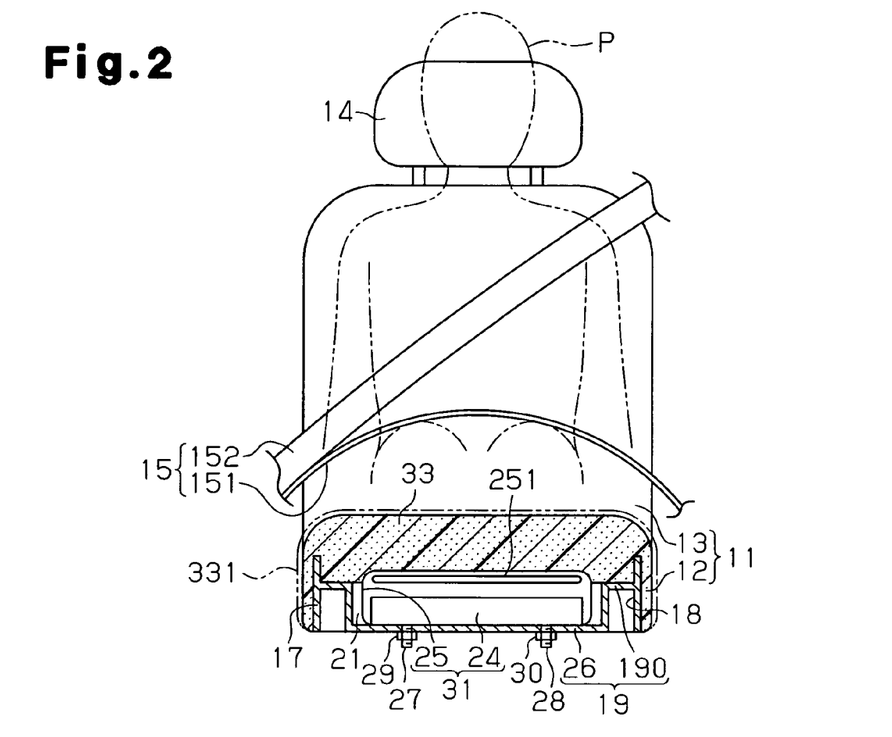
FIG. 2 is a front cross-sectional view of the occupant protecting apparatus.

As shown in FIGS. 1A and 2, a seat belt apparatus 15 for restraining an occupant P seating on the seat 11 is constituted by a three-point seat belt apparatus. A lap belt portion 151 of the seat belt apparatus 15 is bridged over a left side portion via a front side of a lumbar portion Y in a horizontal direction from the lumbar portion Y of the occupant P, for example, a right side portion of the lumbar portion Y, and a shoulder belt portion 152 of the seat belt apparatus 15 is bridged over a side portion of the lumbar portion Y via a front side of a chest portion obliquely from a shoulder portion.

A metal frame 16 constituting the seat portion 12 is provided with a pair of side frames 17 and 18, a first bottom frame 19 and a second bottom frame 34 coupled to the side frames 17 and 18 in front sides of the side frames 17 and 18 and bridged between the side frames 17 and 18, and a rod-shaped rear frame 20 bridged between the side frames 17 and 18 in rear sides of the side frames 17 and 18.

Figure 1B:
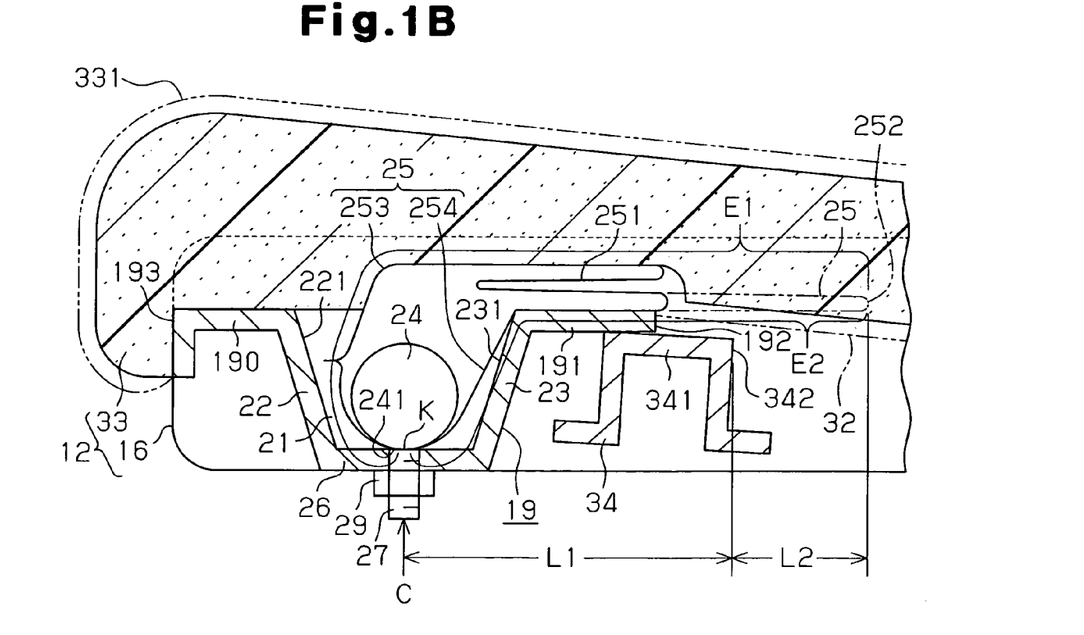
FIG. 1B is a partly enlarged side cross-sectional view of FIG. 1A.

As shown in FIG. 1B, the first bottom frame 19 is provided with a tabular support wall 190, a tabular front wall 22 coupled to the support wall 190 in such a manner as to be hanged from the support wall 190, a tabular rear wall 23 coupled to the support wall 190 in such a manner as to be hung from the support wall 190, and a tabular bottom wall 26 coupling a lower end of the front wall 22 to a lower end of the rear wall 23. The front wall 22, the rear wall 23, and the bottom wall 26 form an accommodation recess 21 depressed downward. In other words, the accommodation recess 21 is formed in the first bottom frame 19 in a shape of being depressed downward. The accommodation recess 21 extends in a direction of width of the seat portion 12, and forms a groove shape.

The front wall 22 of the accommodation recess 21 is inclined forward, and the rear wall 23 is inclined rearward. In other words, an inner surface 221 of the front wall 22 facing the rear wall 23 is inclined forward, and an inner surface 231 of the rear wall 23 facing the front wall 22 is inclined rearward. A height of the front wall 22 in a direction perpendicular to the bottom wall 26 of the accommodation recess 21 is set identical to a height of the rear wall 23 in the direction perpendicular to the bottom wall 26. The tabular support wall 190 and the tabular bottom wall 26 are set in parallel.

As shown in FIG. 2, an inflator 24 corresponding to a gas generation source is accommodated in the accommodation recess 21. The cylindrical inflator 24 is fastened by a screw to the bottom wall 26 of the accommodation recess 21 in a state of being embedded in a cloth airbag 25. A pair of screws 27 and 28 are fixed to a peripheral surface of the inflator 24, and the screws 27 and 28 pass through the bottom wall 26 from top to bottom in a state of passing through the airbag 25 from an inner portion to an outer portion. Nuts 29 and 30 are engaged with the screws 27 and 28 protruding downward from the bottom wall 26. The inflator 24 is fixed to the bottom wall 26 by fastening the nuts 29 and 30, and the airbag 25 is connected to the inflator 24.

As shown in FIGS. 1A and 1B, the airbag 25 constituting an occupant protecting apparatus 31 together with the inflator 24 extends out along an upper surface of a rear portion support wall 191 in the support wall 190 from the interior of the accommodation recess 21. Further, a distal end of the airbag 25 is folded inward toward a front side from a rear side of the seat portion 12 of the seat 11. The inward folding in this case means a folding way that the distal end of the airbag 25 is folded at one time in such a manner as to protrude into the airbag 25. An inwardly folded portion 251 in the distal end of the airbag 25 is mounted on the rear portion support wall 191.

The airbag 25 shown by a chain line in FIG. 1B is extended to a rear side from a front side of the seat portion 12, in a state in which the gas is not supplied from the inflator 24, that is, in a state in which the airbag is not inflated. In this state, the distal end 252 of the airbag 25 is located at a position where the cloth is folded into two, and is formed in a linear shape.

Hereinafter, in the airbag 25, an upper side cloth portion of the doubled cloth is described as an upper side cloth 253, and a lower side cloth portion of the doubled cloth is described as a lower side cloth 254. A peripheral edge portion of the upper side cloth 253 and a peripheral edge portion of the lower side cloth 254 are seamed except the distal end 252. A sheet length E1 of the airbag 25 from a connection position K of the airbag 25 connected to the inflator 24 to the distal end 252 of the airbag 25 via the front side of the inflator 24 is longer than a sheet length E2 of the airbag 25 from the connection position K to the distal end 252 of the airbag 25 via the rear side of the inflator 24. The connection position K is a position of the screws 27 and 28 between a lower end 241 of the inflator 24 and the bottom wall 26 of the accommodation recess 21. A lower portion of the airbag 25 corresponding to the lower end 241 of the inflator 24 corresponds to the connection position K of the airbag 25.

In a state in which the airbag 25 is folded, the cloth portion of the airbag 25 from the connection position K to the distal end 252 of the airbag 25 via the front side of the inflator 24 is located rearward of the front wall 22 forming the accommodation recess 21.

As shown in FIGS. 1A and 1B, a tension spring 32 is tensioned between the rear end 192 of the first bottom frame 19 and the rear frame 20 for improving a comfortable seating performance. A seat cushion 33 constituting the seat portion 12 together with the frame 16 is provided in such a manner as to cover the frame 16, the tension spring 32 for cushioning and the airbag 25 from the above. Reference numeral 331 denotes a cloth or leather cover covering the seat cushion 33.

A second bottom frame 34 for reinforcing is provided below the rear portion support wall 191 in the rear portion in the support wall 190 of the first bottom frame 19. The second bottom frame 34 having a C-shaped horizontal cross sectional shape is coupled to the side frames 17 and 18 and is bridged between the side frames 17 and 18. The second bottom frame 34 supports the rear portion support wall 191 of the first bottom frame 19 from below. A rear end 342 of a support wall 341 of the second bottom frame 34 is located rearward of the rear end 192 of the rear portion support wall 191 of the first bottom frame 19. Further, the support wall 341 of the second bottom frame 34 is located forward of an intermediate position between the front end 193 of the first bottom frame 19 and the rear end of the rear frame 20. Further, the accommodation recess 21 is located forward of an intermediate position in a longitudinal direction of the seat cushion 33.

If collision detecting means (for example, abnormal acceleration detecting means) which is not illustrated detects a collision (for example, an abnormal acceleration) of the vehicle, control means (not shown) actuates the inflator 24, and a high-pressure gas is fed to the airbag 25 from the inflator 24. Accordingly, as shown by a chain line in FIG. 1A, the airbag 25 is inflated and deployed toward the rear end 342 of the support wall 341 of the second bottom frame 34 from the accommodation recess 21 on the bottom frames 19 and 34. The rear portion support wall 191 of the first bottom frame 19 and the support wall 341 of the second bottom frame 34 support the inflated and deployed airbag 25 from below.

The distal end of the inflated and deployed airbag 25 protrudes rearward from the rear end 342 of the support wall 341. The inflation and deployment of the airbag 25 pushes up a knee back of the occupant P seating on the seat 11 through pushing up of the seat cushion 33. The push-up of the knee back of the occupant P contributes to constraint of the occupant P so as to prevent the lumbar portion Y of the occupant P from moving forward.

Figure 3:
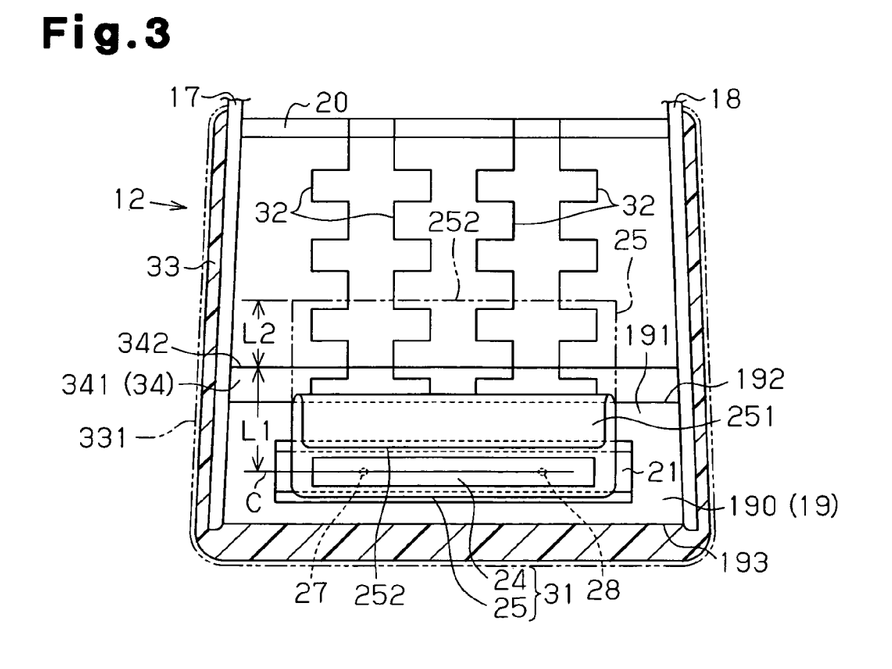
FIG. 3 is a plan cross-sectional view of the occupant protecting apparatus.

The airbag 25 shown by a chain line in FIG. 3 is under a state in which no gas is supplied from the inflator 24, that is, under a state in which the airbag 25 is extended to the rear side from the front side of the seat portion 12 in a non-inflated state (a non-inflated and deployed state). A line C (a line connecting the screw 27 and the screw 28 as seen from the above of the seat portion 12) in FIG. 3 indicates a center position of the inflator 24 in longitudinal direction of the seat portion 12, that is, a backward and forward moving direction of the vehicle. In the state (the non-inflated and deployed state) in which the airbag 25 is extended rearward from a front portion of the seat portion 12 in the non-inflated state, a ratio L2/L1 is set to be equal to or less than 0.77, in which L1 is a distance from the center position C of the inflator 24 to the rear end 342 of the support wall 341 of the second bottom frame 34, and L2 is a distance from the distal end 252 of the airbag 25 to the rear end 342 of the support wall 341 of the second bottom frame 34.

Figure 4:
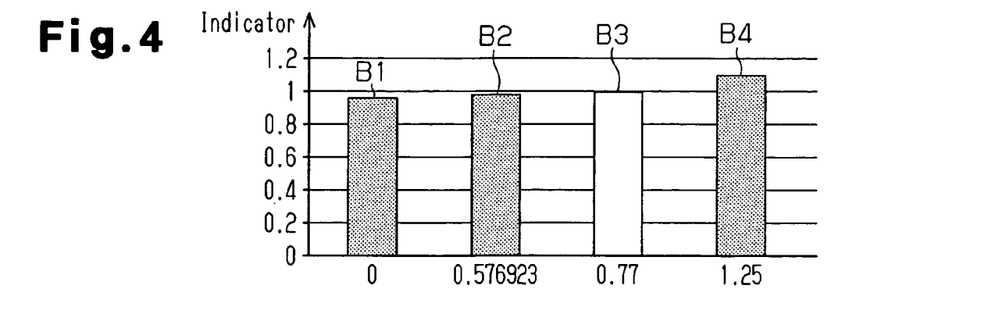
FIG. 4 is a graph showing an experimental data.

A bar graph in FIG. 4 shows an experimental result obtained by measuring an index or an indicator reflecting a level of a load applied to the lumbar portion Y or a leg portion of the occupant P at a time when the airbag 25 is inflated and deployed. The smaller the index is, the smaller the load applied to the lumbar portion Y or the leg portion of the occupant P is. Bar B1 corresponds to an experimental data in the case of the ratio L2/L1=0, and bar B2 corresponds to an experimental data in the case of the ratio L2/L1=0.576923. Bar B3 corresponds to an experimental data in the case of the ratio L2/L1=0.77, and bar B4 corresponds to an experimental data in the case of the ratio L2/L1=1.25. The index in the case that of the ratio L2/L1=0 is 0.95, and the index in the case that of the ratio L2/L1=0.576923 is 0.975. The index in the case that of the ratio L2/L1=0.77 is 1, and the index in the case that of the ratio L2/L1=1.25 is 1.1.

In accordance with the first embodiment, the following advantages are obtained.

(1) The protruding portion of the airbag 25 protruding rearward from the rear end 342 of the support wall 341 of the second bottom frame 34 after inflating and deploying is supported by the tension spring 32 for cushioning from below. Accordingly, an operation that the protruding portion of the inflated and deployed airbag 25 pushes up the seat cushion 33 and the knee back of the occupant P is absorbed by the tension spring 32 for cushioning so as to be reduced.

In other words, even if the length (the distance L2) of the protruding portion of the airbag 25 protruding rearward from the rear end 342 of the support wall 341 of the second bottom frame 34 is enlarged, an effect contributing to the constraint of the lumbar portion Y of the occupant P by pushing up the knee back of the occupant P is small. Further, as is apparent from the experimental result mentioned above, there is a tendency that the larger the protruding length (the distance L2) of the airbag 25 is, the larger the load applied to the occupant P at a time of inflating the airbag 25 is.

In the case that the ratio L2/L1 is set to be equal to or less than 0.77 so that the index becomes equal to or less than 1, it is possible to prevent the effect of pushing up the knee back of the occupant P on the basis of the inflation and deployment of the airbag 25 from being absorbed by the tension spring 32 for cushioning so as to be reduced. Further, in the case that the ratio L2/L1 is set to be equal to or less than 0.77 so that the index becomes equal to or less than 1, it is preferable for reducing the load applied to the occupant P by inflating the airbag 25.

(2) It is assumed that in the case that the airbag 25 is under the folded state before being inflated and deployed, the cloth portion of the airbag 25 from the connection position K to the distal end 252 of the airbag 25 via the front side of the inflator 24 protrudes to the front side of the front wall 22 of the accommodation recess 21. Then, when the airbag 25 is inflated and deployed, a part of the airbag 25 tends to be inflated forward of the accommodation recess 21. In other words, the gas within the airbag 25 going to be inflated and deployed is pushed forward by the load of the seating occupant P, and a part of the airbag 25 is going to be inflated frontward of the accommodation recess 21. If a part of the airbag 25 is inflated forward from the accommodation recess 21, the upward inflation of the airbag 25 from the accommodation recess 21 and the rearward inflation of the airbag 25 from the accommodation recess 21 are reduced. The inflated state mentioned above prevents the knee back of the occupant P from being largely pushed up.

In accordance with the first embodiment, when the airbag 25 is under the folded state, the cloth portion of the airbag 25 from the connection position K to the distal end 252 of the airbag 25 via the front side of the inflator 24 is located in the rear side of the front wall 22 of the accommodation recess 21. In other words, when the airbag 25 is under the folded state, the cloth portion of the airbag 25 from the connection position K to the distal end 252 of the airbag 25 via the front side of the inflator 24 does not protrude forward of the front wall 22 forming the accommodation recess 21. Accordingly, when the airbag 25 is inflated and deployed, a part of the airbag 25 is hard to be inflated forward of the accommodation recess 21. The inflated state of the airbag 25 mentioned above contributes to largely pushing up the knee back of the occupant P. In other words, in the case that the cloth portion of the airbag 25 from the connection position K to the distal end 252 of the airbag 25 under the folded state via the front side of the inflator 24 is located in the rear side of the front wall 22, an advantage can be obtained for largely pushing up the knee back of the occupant P.

(3) In order to prevent the submarine phenomenon, it is advantageous to rapidly push up the knee back of the occupant. The inflator disclosed in Japanese Laid-Open Patent Publication No. 2001-239872 is installed on the flat portion of the support panel, and the airbag embedding the inflator therein is extended rearward. Accordingly, the airbag extended rearward is inflated and deployed exclusively rearward along the flat portion of the support panel. In other words, the upward inflation of the airbag is small just above the inflator, and it is hard to rapidly push up the knee back of the occupant.

In the case that the inflator 24 is accommodated within the accommodation recess 21, since the high-pressure gas generated in the inflator 24 is first directed upward from the interior of the accommodation recess 21, the airbag 25 embedding the inflator 24 therein tends to be rapidly inflated upward from the inflator 24, that is, upward in the upper portion of the accommodation recess 21. In other words, in the case that the inflator 24 is accommodated within the accommodation recess 21, it is advantageous for rapidly pushing up the knee back of the occupant P.

(4) It is desirable that the airbag 25 is rapidly inflated and deployed toward the rear side of the seat portion 12 from the accommodation recess 21, for rapidly pushing up the knee back of the occupant P. Accordingly, it is preferable to apply the reaction force toward the rear side of the seat portion 12 from the accommodation recess 21 to the gas pressure within the airbag 25.

The inner surface 221 serving as the front wall surface forming the accommodation recess 21 is inclined forward. The gas pressure within the airbag 25 obtains the reaction force from the forward sloped inner surface 221. In other words, the inner surface 221 serves as a surface receiving the reaction force against the gas pressure at a time of inflating and deploying the airbag 25. The inner surface 221 mentioned above comes to a preferable position for receiving the reaction force against the gas pressure within the airbag 25 in the course of inflating and deploying toward the rear side of the seat portion 12 from the accommodation recess 21.

(5) It is necessary that the airbag 25 is smoothly inflated and deployed toward the rear side of the seat portion 12 from the accommodation recess 21, for rapidly pushing up the knee back of the occupant P. Accordingly, it is important to smoothly introduce the high-pressure gas generated from the inflator 24 onto the rear portion support wall 191 of the first bottom frame 19 from the interior of the accommodation recess 21. The inner surface 231 of the rear wall 23 forming the accommodation recess 21 is inclined rearward. The inner surface 231 mentioned above is advantageous for smoothly introducing the high-pressure gas generated from the inflator 24 onto the rear portion support wall 191 of the first bottom frame 19 from the interior of the accommodation recess 21. In other words, the inner surface 231 inclined rearward comes to a preferable position for smoothly introducing the airbag 25 inflating and deploying toward the rear side of the seat portion 12 from the accommodation recess 21.

(6) It is necessary that the airbag 25 is smoothly inflated and deployed toward the rear side of the seat portion 12 from the accommodation recess 21, for rapidly pushing up the knee back of the occupant P. The sheet length E1 of the airbag 25 from the connection position K of the airbag 25 to the inflator 24 to the distal end 252 of the airbag 25 via the front portion of the inflator 24 is set to be longer than the sheet length E2 of the airbag 25 from the connection position K to the distal end 252 of the airbag 25 via the rear portion of the inflator 24. The setting mentioned above of the sheet constituting the airbag 25 having the inwardly folded portion 251 is effective for smoothly inflating and deploying the distal end of the airbag 25 toward the rear side of the seat portion 12 from the accommodation recess 21.

Figure 5:
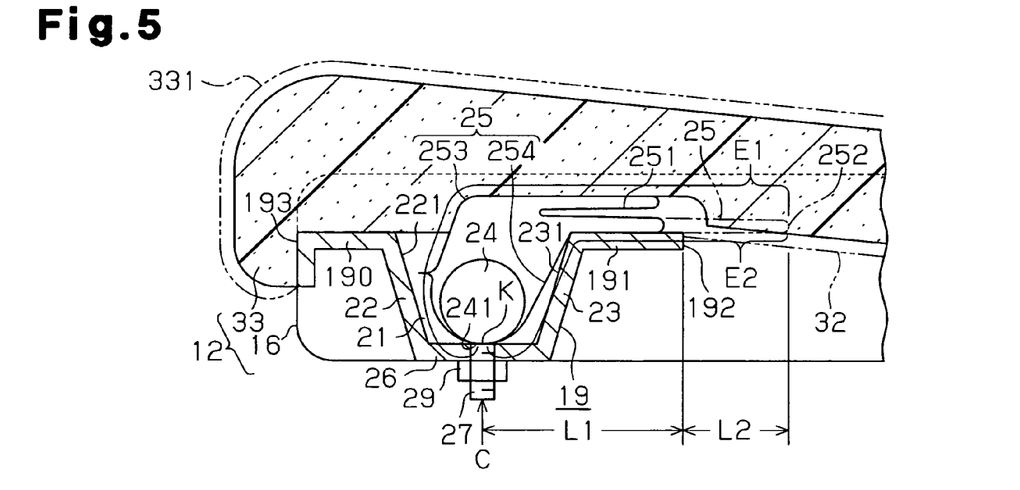
FIG. 5 is a side cross-sectional view showing an occupant protecting apparatus according to a second embodiment.

Next, a description will be given of a second embodiment with reference to FIG. 5. The same reference numerals are given to the same constituting portions as those of the first embodiment.

In the second embodiment, the second bottom frame 34 in the first embodiment is omitted. Further, in the state (the non-inflated and deployed state) in which the airbag 25 is extended to the rear side from the front side of the seat portion 12 in the non-inflated state, the ratio L2/L1 between the distance L1 from the center position C of the inflator 24 to the rear end 192 of the rear portion support wall 191 in the first bottom frame 19, and the distance L2 from the distal end 252 of the airbag 25 to the rear end 192 is set to be equal to or less than 0.77.

In the second embodiment, the same advantages as those of the first embodiment can be obtained.

Figure 6:
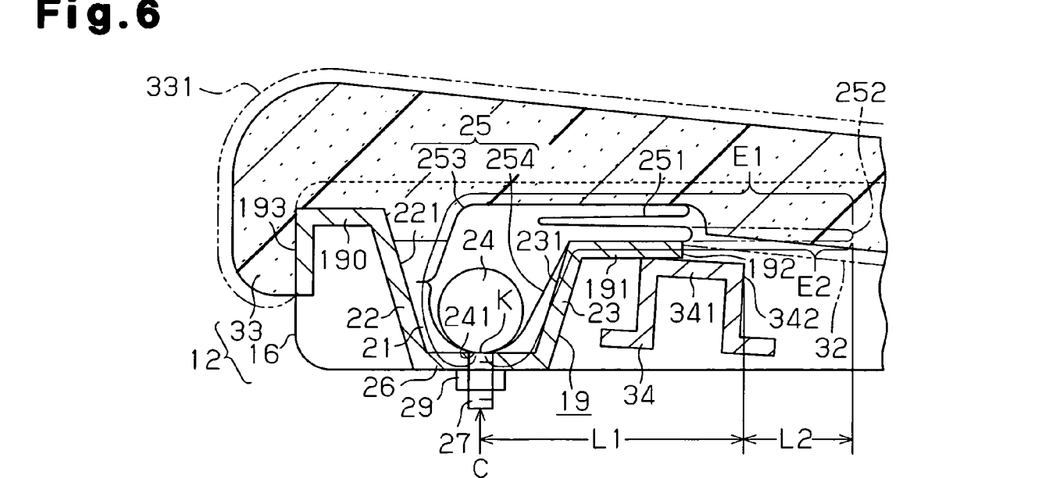
FIG. 6 is a side cross-sectional view showing an occupant protecting apparatus according to a third embodiment.

Next, a description will be given of a third embodiment with reference to FIG. 6. The same reference numerals are given to the same constituting portions as those of the first embodiment.

The rear portion support wall 191 in the rear portion in the support wall 190 is set to be lower than the other positions of the support wall 190. The structure mentioned above is advantageous for smoothly introducing the high-pressure gas generated from the inflator 24 onto the rear portion support wall 191 of the first bottom frame 19 from the interior of the accommodation recess 21 so as to smoothly inflate and deploy the airbag 25 to the rear side of the seat portion 12 from the accommodation recess 21.

Next, a description will be given of a fourth embodiment obtained by embodying the present invention, with reference to FIGS. 7 to 10.

Figure 7:
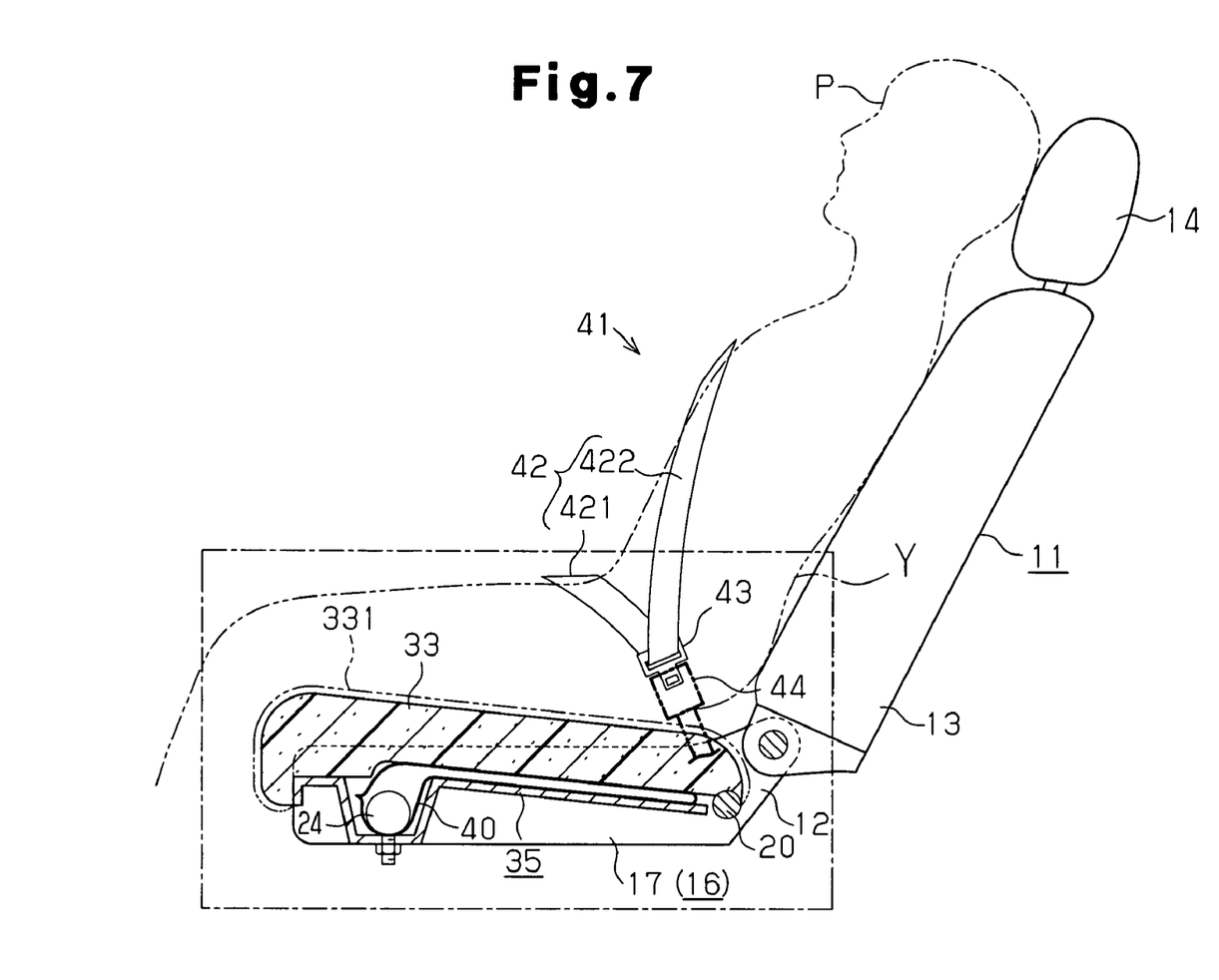
FIG. 7 is a side cross-sectional view showing a seat to which an occupant protecting apparatus according to a fourth embodiment is applied.
Figure 8:
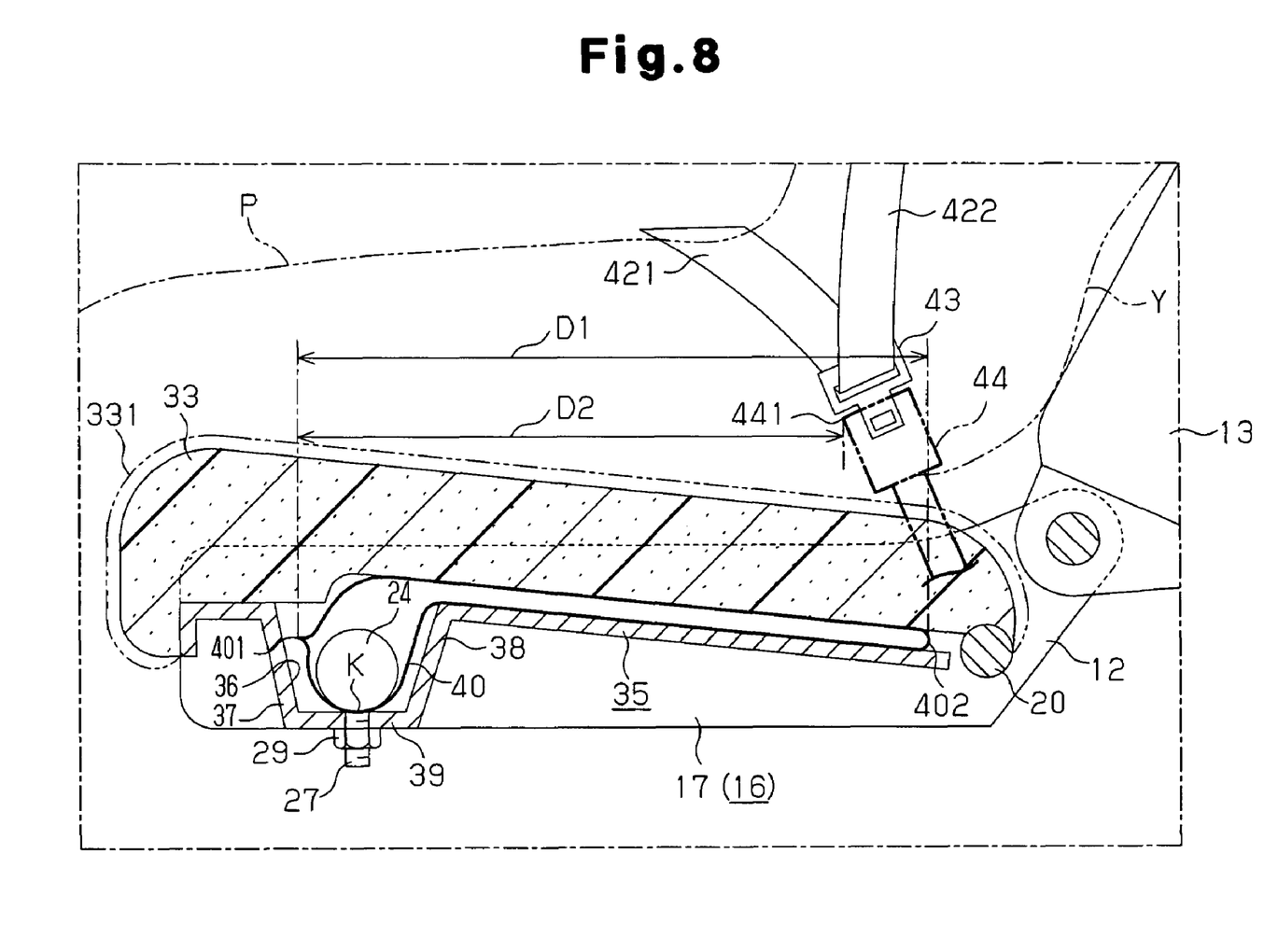
FIG. 8 is a partly enlarged view of the occupant protecting apparatus in FIG. 7.

In the fourth embodiment, as shown in FIGS. 7 and 8, the structure supporting the seat cushion 33 in the seat 11, that is, the structure of the frame 16 is different from the first to third embodiments. The seat cushion 33 corresponds to a position supporting a portion from the hip portion to a femoral portion of the occupant P. The frame 16 is provided with a pair of side frames 17 and 18, and a rod-shaped rear frame 20 bridged between the rear end portions of the side frames 17 and 18 (refer to FIG. 2). This point is the same as the first embodiment. In addition, the frame 16 is provided with a support plate (which may be called as a sheet pan) 35 in place of the first bottom frame 19, the second bottom frame 34 and the tension spring 32 for cushioning in the first embodiment.

The support plate 35 is formed in a shape obtained by extending the rear portion support wall 191 of the first bottom frame 19 in the first embodiment to a portion close to the front side of the rear frame 20. In other words, an approximately entirety of the support plate 35 is formed generally in a tabular shape. An accommodation recess 36 having the same structure as the accommodation recess 21 of the first bottom frame 19 is formed at a front portion of the support plate 35, that is, a position forward of the in the intermediate position in the longitudinal direction of the seat cushion 33. The accommodation recess 36 is depressed downward in comparison with the other positions of the support plate 35, and has a groove shape extending in a direction of width of the seat portion 12. A front wall 37 of the accommodation recess 36 is inclined forward in such a manner as to become higher toward the front side. Further, a rear wall 38 of the accommodation recess 36 is inclined rearward in such a manner as to become higher toward the rear side. The support plate 35 having the structure mentioned above supports an approximately entirety of the seat cushion 33 from below.

The inflator 24 serving as the gas generation source and an airbag 40 are arranged between the seat cushion 33 and the support plate 35. The inflator 24 is arranged within an accommodation recess 36 in a state of being embedded in the airbag 40, and is fastened by a screw to a bottom wall 39 of the accommodation recess 36 together with the airbag 40 by the screw 27 and the nut 29.

The airbag 40 extends rearward of the accommodation recess 36 along an upper surface of the support plate 35 from an interior of the accommodation recess 36 without being folded. In other words, the airbag 40 is arranged on the support plate 35 in the non-inflated and deployed state. A front end 401 of the airbag 40 is positioned within the accommodation recess 36, and a rear end 402 is positioned forward of the rear frame 20. The airbag 40 does not protrude forward of the accommodation recess 36.

A fastened position of the airbag 40 to the inflator 24 and the bottom wall 39 by the nut 29 is set to a connection position K. A sheet length from the connection position K to the rear end 402 of the airbag 40 via the front side of the inflator 24 is set to be longer than a sheet length from the connection position K to the rear end 402 via a rear side of the inflator 24. This point is the same as the first embodiment.

Figure 9:
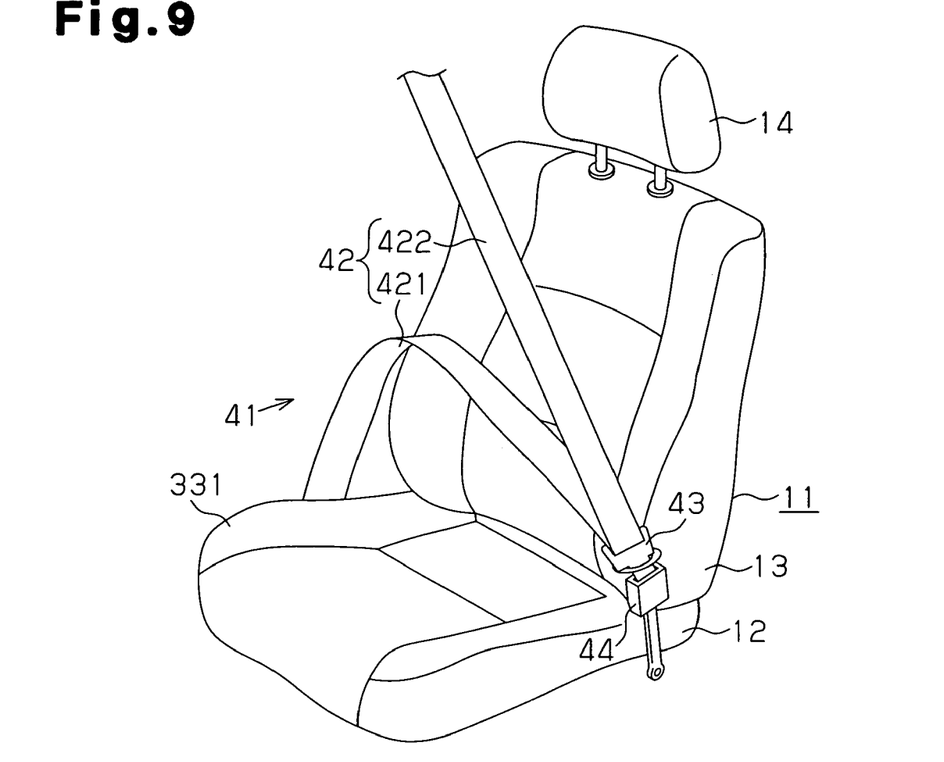
FIG. 9 is a perspective view showing a seat and a seat belt apparatus.

Further, although a description is omitted in the first to third embodiments, a seat belt apparatus 41 is provided with a band-like webbing 42 restraining the occupant P, a tongue 43 attached to the webbing 42 so as to be movable in a longitudinal direction thereof, and a buckle 44 arranged in a side portion of the seat portion 12 and to which the tongue 43 is detachably installed, as shown in FIGS. 7 and 9. The webbing 42 is structured such that a first end portion is fixed to an opposite side to the buckle 44 in the seat portion 12, and a second end portion is wound by a belt take-up apparatus (not shown). In the seat belt apparatus 41, it is possible to change each of lengths of a lap belt portion 421 and a shoulder belt portion 422 by sliding the tongue 43 with respect to the webbing 42.

The lap belt portion 421 corresponds to a portion from the tongue 43 to the first end portion of the webbing 42 in the webbing 42, is bridged over a left side from a right side of the lumbar portion Y of the seating occupant P in a horizontal direction via a front side of the lumbar portion Y, as mentioned above and constrains mainly the lumbar portion Y. The shoulder belt portion 422 corresponds to a portion from the tongue 43 to the belt take-up apparatus in the webbing 42, is bridged over the side portion of the lumbar portion Y from the shoulder portion of the seating occupant P obliquely via the front side of the chest portion, as mentioned above, and constrains mainly the shoulder portion of the occupant P. Further, the seat belt apparatus 41 constitutes the occupant protecting apparatus together with the inflator 24, the airbag 40 and the like.

In this case, it is assumed that the airbag 40 as mentioned above is not arranged between the seat cushion 33 and the support plate 35. In this case, if the impact is applied from the front side to the vehicle in which the occupant P is constrained to the seat 11 by the seat belt apparatus 41, the entire body of the occupant P is going to move forward on the basis of inertia. There is a risk that the submarine phenomenon that the lumbar portion Y comes off the lap belt portion 421 of the seat belt apparatus 41 so as to move forward is generated, depending on some seating posture of the occupant P.

On the contrary, in the fourth embodiment in which the airbag 40 is arranged between the seat cushion 33 and the support plate 35, the gas is generated from the inflator 24 in response to the impact, and the airbag 40 is inflated. On the basis of the inflation, the seat cushion 33 is lifted up, and the portion in the rear side of the knee back in the lower body of the occupant P is pressed upward. On the basis of the pressing, the motion of the lumbar portion Y to the front side is limited, and the submarine phenomenon is suppressed.

In this case, the length of the airbag 40 has a proper range. In the case that the length is excessively long to the rear side, the entirety of the lower body of the occupant P is lifted up on the basis of the inflation of the airbag 40 in response to an impact from the front side, and the effect of limiting the forward motion of the lumbar portion Y so as to suppress the submarine phenomenon becomes small. Accordingly, the load applied to the lumbar portion Y on the basis of the inflation of the airbag 40 is enlarged.

In this case, as shown in FIG. 8, in the airbag 40 under the non-inflated and deployed state, a horizontal distance from the front end 401 to the rear end 402 is set to D1, and a horizontal distance from the front end 401 to a distal end 441 of the buckle 44 in the seat belt apparatus 41 is set to D2. In this case, a front end in an upper surface of the buckle 44, that is, a corner portion in a front side is set to the distal end 441. Each of the horizontal distances D1 and D2 corresponds to a distance between two points projected on the same horizontal surface. The horizontal distance D1 approximately corresponds to the length of the airbag 40. If the front end 401 of the airbag 40 is positioned, and the position of the rear end 402 is variously changed, the length of the airbag 40 is changed in correspondence thereto.

On the other hand, a position of the distal end 441 of the buckle 44 is previously decided in the occupant protecting apparatus. Accordingly, when the position of the rear end 402 of the airbag 40 is set to the rear side, and the airbag 40 is made longer toward the rear side, the ratio D1/D2 becomes enlarged. Further, a positive correlation appears between a load applied to the lumbar portion Y on the basis of the inflation of the airbag 40, and an acceleration generated in the lumbar portion Y. In addition, the acceleration generated in the lumbar portion Y corresponds to an acceleration applied to the chest portion. Accordingly, various values are set as the ratio D1/D2, and the acceleration generated in the chest portion is measured as a corresponding value to the acceleration generated in the lumbar portion Y of the occupant.

Figure 10:
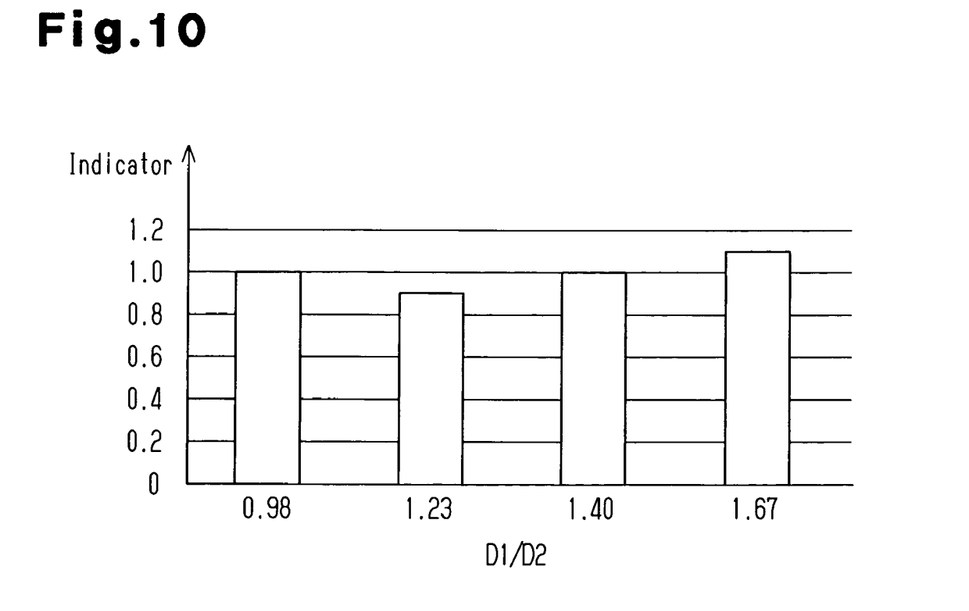
FIG. 10 is a graph showing an experimental data, about a relationship between a ratio D1/D2 and an index of a load.

A bar graph in FIG. 10 is obtained by putting the measured results together. In detail, FIG. 10 shows a result obtained by measuring an index reflecting a level of the load applied to the lumbar portion Y of the occupant P at a time of inflating the airbag 40 mentioned above. At a time of this measurement, a crash test dummy having the same physical constitution as that of the average occupant P was arranged in the seat in the seating posture, the crash test dummy was constrained to the seat by the seat belt apparatus, and an acceleration sensor was attached to a chest portion of the crash test dummy. The airbag was inflated by applying the same magnitude of impact as that of the vehicle collision time to the seat and the crash test dummy from the front side, and an acceleration generated in the chest portion of the crash test dummy changing the posture was measured by the accelerator sensor. The load applied to the lumbar portion was determined on the basis of the result of measurement. This work was executed with respect to plural kinds of airbags 40 having different horizontal distances D1.

As a result of the measurement mentioned above, it was found out that the load (index: 1.0) in the case that the ratio D1/D2 was 1.40 came to a maximum value (an upper limit value) in an allowable range for the general occupant P. If the longitudinal length of the airbag 40 is long, and the ratio D1/D2 is larger than 1.40, the load applied to the occupant P gets over the allowable range, and the index becomes larger than 1.0.

In this case, it is necessary that the ratio D1/D2 be equal to or more than 0.98 in addition to being equal to or less than 1.40. If the ratio D1/D2 is made smaller than 0.98, it is impossible to sufficiently obtain the lift-up amount of the seat cushion 33 on the basis of the inflation of the airbag 40, and the upward pressing force applied to the portion in the lower body of the occupant P rearward of the knee back, and it is hard to obtain the effect of limiting the forward motion of the lumbar portion Y.

On the basis of the prehistory mentioned above, in the fourth embodiment, there is employed the airbag 40 in which the ratio D1/D2 is equal to or more than 0.98 and equal to or less than 1.40.

The other structures than the above are the same as those of the first embodiment. Accordingly, the same reference numerals are given to the same constituting portions as those of the first embodiment and a description thereof will be omitted.

In the occupant protecting apparatus having the structure mentioned above, if the impact is applied to the vehicle from the front side, the high-pressure gas is supplied to the airbag 40 from the inflator 24. In this case, since the inflator 24 is arranged within the accommodation recess 36, the high-pressure gas is always directed upward from the interior of the accommodation recess 36. Accordingly, the airbag 40 is first inflated rapidly upward. Subsequently, the airbag 40 is inflated rearward from the accommodation recess 36 on the support plate 35. At this time, since the gas pressure within the airbag 40 receives the reaction force from the front wall 37 inclined forward in the accommodation recess 36, the airbag 40 is rapidly inflated rearward. Further, the rear wall 38 inclined rearward in the accommodation recess 36 smoothly introduces the high-pressure gas generated from the inflator 24 to a portion rearward of the accommodation recess 36 on the support plate 35. Further, the support plate 35 supports the inflated airbag 40 from below.

In this case, in the non-inflated and deployed state of the airbag 40, the front end 401 thereof does not protrude forward of the accommodation recess 36. Accordingly, when the airbag 40 is inflated, the phenomenon that a part of the airbag 40 is inflated forward of the accommodation recess 36 is hard to be generated, and it is possible to secure the upward inflation of the airbag 40 from the accommodation recess 36, and the inflation rearward of the accommodation recess 36.

Further, the airbag 40 inflating as mentioned above largely pushes the seat cushion 33, and largely pushes the knee back of the occupant P seating on the seat 11 through the push-up. The push-up of the knee of the occupant P contributes to the constraint of the occupant P in such a manner as to prevent the lumbar portion Y of the occupant P from moving forward.

Therefore, in accordance with the fourth embodiment, in addition to the same advantages as the items (2) to (6), the following advantages are obtained.

(7) It is possible to reduce the load applied to the occupant P caused by the inflation of the airbag 40 so as to set the load to the magnitude within the allowable range, by setting the ratio D1/D2 between the horizontal distance D1 from the front end 401 to the rear end 402, and the horizontal distance D2 from the front end 401 to the distal end 441 of the buckle 44, to be equal to or less than 1.40, at a time when the airbag 40 is set to the non-inflated and deployed state.

It is possible to secure the lift-up amount of the seat cushion 33 on the basis of the inflation of the airbag 40 so as to limit the forward motion of the lumbar portion Y and securely suppress the submarine phenomenon, by setting the ratio D1/D2 to be equal to or more than 0.98.

(8) If the airbag 40 is arranged in a folded state, the gas from the inflator 24 inflates the airbag 40 while canceling the folded state of the airbag 40. In this regard, in accordance with the fourth embodiment, the airbag 40 is arranged in the previously deployed state, and is not folded. Accordingly, it is not necessary to cancel the folded state as mentioned above, and it is possible to rapidly inflate the airbag 40 by the gas at that degree.

The present invention may be embodied as follows.

The airbag 25 before being inflated and deployed may be used in a state of being extended to the rear side of the seat portion 12 from the accommodation recess 21 without being folded as shown by the chain line in FIG. 1B.

The inflator 24 may be fastened by a screw to the front wall 22 or the rear wall 23 of the accommodation recess 21.

The inflator 24 may be installed on the bottom frame in which the accommodation recess 21 does not exist.

In the fourth embodiment in which the airbag 40 is arranged in the deployed state, an accommodation space for accommodating the airbag 40 is necessary between the seat cushion 33 and the support plate 35. No problem is generated in the case that a sufficient large accommodation space can be secured, however, there is a case that the sufficient space cannot be secured.

Figure 11:
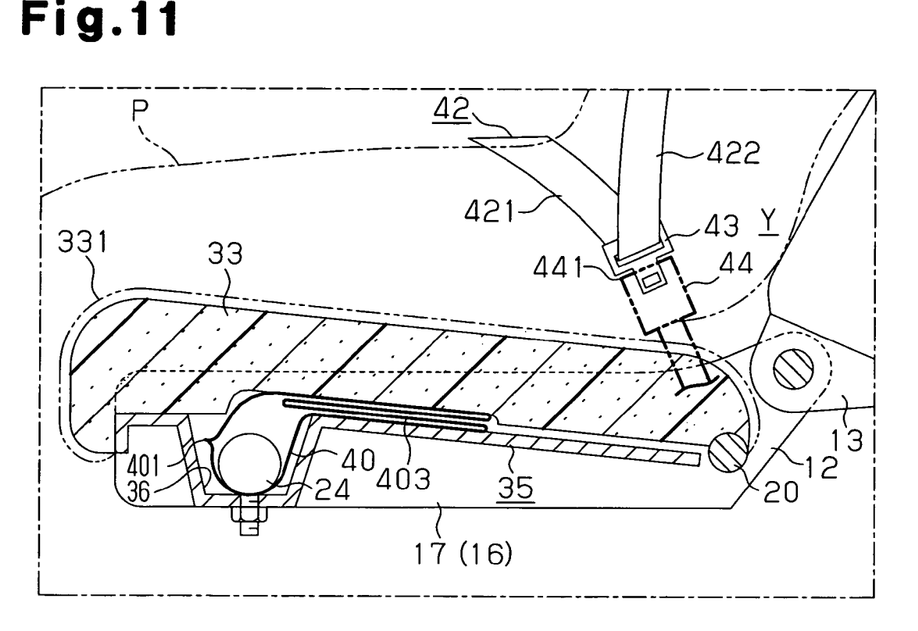
FIG. 11 is a partly side cross-sectional view showing another embodiment in which a part of an airbag is arranged so as to be folded.

Accordingly, as shown in FIG. 11, the airbag 40 may be arranged between the seat cushion 33 within the seat portion 12 and the support plate 35 in the folded state, before being inflated by gas. In this case, the ratio D1/D2 is set to be equal to or more than 0.98 and equal or less than 1.40. D1 is a horizontal distance from the front end 401 to the rear end 402 in the case that the airbag 40 is set to the non-inflated and deployed state as mentioned above, that is, at a time when the folded state is canceled in this case.

The folding way of the airbag 40 may employ "inward folding" in the same manner as the first embodiment, and may employ other folding ways, for example, a bellows folding or the like. If the airbag 40 is arranged in the folded state as mentioned above, the airbag 40 can be accommodated in the accommodation space, even in the case that the sufficiently large accommodation space can not be secured between the seat cushion 33 and the support plate 35, which facilitates the installation.

In this case, in FIG. 11, there is employed "inward folding" in which the rear portion of the airbag 40 is folded back so as to be positioned inside the front side portion. Further, an inwardly folded portion 403 is formed in the airbag 40 in accordance with the inward folding, and the longitudinal length of the airbag 40 is made shorter in accordance therewith. Although the accommodation space is short in the longitudinal direction, it is possible to accommodate the airbag 40 therein.

Advantages and disadvantages exist in the sight of the installation and the inflation as mentioned above between the case that the airbag 40 is arranged in the folded state (FIG. 11) and the case that the airbag 40 is arranged in the deployed state (the fourth embodiment). Accordingly, taking the advantages and disadvantages mentioned above into consideration, it is desirable to select the magnitude of the accommodation space in the seat portion 12, and the shape (with or without the fold) at a time of arranging the airbag 40, in correspondence to the required inflating performance or the like.

Figure 12:
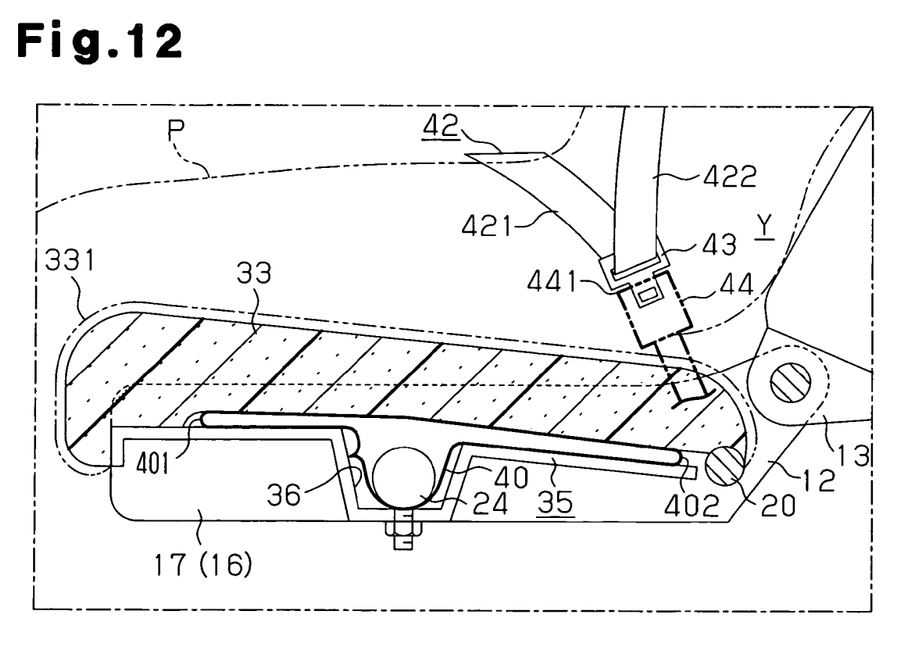
FIG. 12 is a partly side cross-sectional view showing another embodiment in which an inflator and an accommodation recess are provided in an intermediate portion in a longitudinal direction of a seat portion.

The longitudinal position of the inflator 24 with respect to the airbag 40 in the non-inflated and deployed state may be changed from the fourth embodiment. In this case, it is necessary to also change the longitudinal position of the accommodation recess 36 in the support plate 35. FIG. 12 shows one example thereof. In this example, the inflator 24 is arranged in an intermediate portion in the longitudinal direction of the airbag 40 in the non-inflated and deployed state, and the accommodation recess 36 is provided in an intermediate portion in the longitudinal direction of the support plate 35.

In the fourth embodiment, the structure may be changed such that the support plate 35 having no accommodation recess 36 is used, and the inflator 24 and the airbag 40 are arranged thereon.

The invention claimed is:

1. An occupant protecting apparatus for a vehicle comprising:
 a seat portion of a seat of a vehicle, the seat portion having a seat cushion, and a support plate supporting said seat cushion from below;
 an airbag inflated and deployed in said seat portion, the airbag being provided for protecting an occupant of the vehicle;
 a gas generation source that generates gas for inflating and deploying said airbag; and a seat belt apparatus for restraining the occupant to said seat, the seat belt apparatus having a webbing for restraining the occupant, a tongue movably attached to the webbing, and a buckle arranged on a side of said seat portion, the tongue being detachably installed to the buckle, wherein said airbag is arranged between said seat cushion in said seat portion and said support plate, and wherein a ratio D1/D2 becomes equal to or more than 0.98 and equal to or less than 1.40 at a time when said airbag is in a non-inflated and deployed state, in which D1 is a horizontal distance from a front end of the airbag to a rear end, and D2 is a horizontal distance from the front end of the airbag to a distal end of said buckle in said seat belt apparatus.

2. The occupant protecting apparatus according to claim 1, wherein said airbag is arranged on said support plate within said seat portion in a deployed state before being inflated by said gas.

3. The occupant protecting apparatus according to claim 1, wherein said airbag is arranged on said support plate within said seat portion in a folded state, before a time when the folded state is canceled and shifted to the non-inflated and deployed state by inflation gas, wherein the ratio D1/D2 is set to be equal to or more than 0.98 and equal to or less than 1.40 when the folded state is canceled and shifted to the non-inflated and deployed state.

4. The occupant protecting apparatus according to claim 1, wherein said airbag is arranged on said support plate within said seat portion in a folded state before inflation gas unfolds the airbag, and the ratio D1/D2 is set to be equal to or more than 0.98 and equal to or less than 1.40 when the airbag is unfolded to the non-inflated and deployed state by said gas and before the airbag is inflated.

* * * * *